(12) United States Patent
Watanabe

(10) Patent No.: US 8,194,158 B2
(45) Date of Patent: Jun. 5, 2012

(54) IMAGE PROCESSOR, IMAGE PROCESSING METHOD, DIGITAL CAMERA, AND IMAGING APPARATUS

(75) Inventor: Yoshikazu Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 330 days.

(21) Appl. No.: 12/668,245

(22) PCT Filed: Jul. 23, 2008

(86) PCT No.: PCT/JP2008/063618
§ 371 (c)(1),
(2), (4) Date: Jan. 8, 2010

(87) PCT Pub. No.: WO2009/017138
PCT Pub. Date: Feb. 5, 2009

(65) Prior Publication Data
US 2010/0328477 A1    Dec. 30, 2010

(30) Foreign Application Priority Data

Jul. 27, 2007 (JP) ................. 2007-196507
Jan. 23, 2008 (JP) ................. 2008-012251

(51) Int. Cl.
*H04N 9/64* (2006.01)
*H04N 5/228* (2006.01)
*H04N 5/222* (2006.01)
*H04N 5/235* (2006.01)
*H04N 9/74* (2006.01)
*G06K 9/34* (2006.01)
*G06K 9/40* (2006.01)

(52) U.S. Cl. ............... 348/248; 348/222.1; 348/333.02; 348/333.12; 348/221.1; 348/586; 382/173; 382/264; 382/255; 382/261

(58) Field of Classification Search ............. 348/221.1, 348/223.1, 345, 207.99, 207.1, 234, 235, 348/354, E5.058, 586, 464, 272, 241–252, 348/208.16, 333.02–333.12; 382/176, 173, 171, 232, 254, 255, 233, 264, 274–275, 260, 298–299, 261
See application file for complete search history.

(56) References Cited

U.S. PATENT DOCUMENTS 6,900,841 B1    5/2005 Mihara
(Continued)

FOREIGN PATENT DOCUMENTS

JP    62-180475 A    8/1987
(Continued)

OTHER PUBLICATIONS

Nguyen, Thang C. et al., "Image Blurring Effects Due to Depth Discontinuities: Blurring that Creates Emergent Image Details", vol. 10, No. 10, Dec. 1, 1992, pp. 689-698.
(Continued)

*Primary Examiner* — Lin Ye
*Assistant Examiner* — Marly Camargo
(74) *Attorney, Agent, or Firm* — Dickstein Shapiro LLP

(57) ABSTRACT

An image processor (24) includes an image processing section (04) which performs a blurring process on a given image data. The image processing section (04) is provided with an image data reduction part (04A), a spatial filter processing part (04B), and an image data expansion part (04C). The image data reduction part (04A) reduces the given image data at a predetermined reduction rate to generate a reduced image data. The spatial filter processing part (04B) performs a spatial filter process on the reduced image data reduced by the image data reduction part (04A) to generate a processed image data. An image data expansion part (04C) expands the processed image data processed by the spatial filter processing part (04B) at an expansion rate inverse of the reduction rate.

10 Claims, 12 Drawing Sheets

U.S. PATENT DOCUMENTS

| | | | |
|---|---|---|---|
| 7,027,171 | B1 | 4/2006 | Watanabe |
| 7,324,139 | B2 | 1/2008 | Watanabe |
| 2002/0159648 | A1 | 10/2002 | Alderson et al. |
| 2003/0052988 | A1 | 3/2003 | Kurosawa |
| 2004/0051789 | A1 | 3/2004 | Horita |
| 2004/0051794 | A1* | 3/2004 | Horita ................ 348/234 |
| 2004/0174444 | A1 | 9/2004 | Ishii |
| 2005/0286794 | A1 | 12/2005 | Brunner et al. |
| 2006/0059201 | A1 | 3/2006 | Watanabe |
| 2007/0071432 | A1* | 3/2007 | Senba ................ 396/121 |
| 2009/0096897 | A1* | 4/2009 | Saito ................ 348/241 |
| 2010/0007759 | A1* | 1/2010 | Watanabe ........... 348/222.1 |

FOREIGN PATENT DOCUMENTS

| | | |
|---|---|---|
| JP | 09-318870 A | 12/1997 |
| JP | 11-266388 A | 9/1999 |
| JP | 2000-350077 A | 12/2000 |
| JP | 2000-354181 A | 12/2000 |
| JP | 2002-152590 A | 5/2002 |
| JP | 2003-037767 A | 2/2003 |
| JP | 2003-101858 A | 4/2003 |
| JP | 2003-250120 A | 9/2003 |
| JP | 2004-032553 A | 1/2004 |
| JP | 2004-040204 A | 2/2004 |
| JP | 2004-102543 A | 4/2004 |
| JP | 2004-102903 A | 4/2004 |
| JP | 2004-102904 A | 4/2004 |
| JP | 2004-104534 A | 4/2004 |
| JP | 2004-112537 A | 4/2004 |
| JP | 2004-112549 A | 4/2004 |
| JP | 2004-112550 A | 4/2004 |
| JP | 2004102903 A * | 4/2004 |
| JP | 2004-260768 A | 9/2004 |
| JP | 2004-266774 A | 9/2004 |
| JP | 2004-336170 A | 11/2004 |
| JP | 2005-073119 A | 3/2005 |
| JP | 2005-184469 A | 7/2005 |
| JP | 2006-011539 A | 1/2006 |
| JP | 2006-013776 A | 1/2006 |
| JP | 2006-013782 A | 1/2006 |
| JP | 2006-086661 A | 3/2006 |
| JP | 2006-254333 A | 9/2006 |
| JP | 2006-295573 A | 10/2006 |
| JP | 2006-333299 A | 12/2006 |
| JP | 2007-019961 A | 1/2007 |
| JP | 3913726 B2 | 2/2007 |
| JP | 3940555 B2 | 4/2007 |
| JP | 2007-134910 A | 5/2007 |
| JP | 3954879 B2 | 5/2007 |
| JP | 4028246 B2 | 10/2007 |
| JP | 2007-304774 A | 11/2007 |
| JP | 2008-065641 A | 3/2008 |
| JP | 2008-078738 A | 4/2008 |
| JP | 2008-193387 A | 8/2008 |
| JP | 2009-027298 A | 2/2009 |
| JP | 2009-054130 A | 3/2009 |
| JP | 2009-055125 A | 3/2009 |

OTHER PUBLICATIONS

Wong E., "A New Method for Creating a Depth Map for Camera Auto Focus Using an All in Focus Picture and 2D Scale Space Matching", Jan. 1, 2006, pp. III-1184-III-1187.

* cited by examiner

UPPER SURFACE OF CAMERA

FRONT SURFACE OF CAMERA

BACK SURFACE OF CAMERA

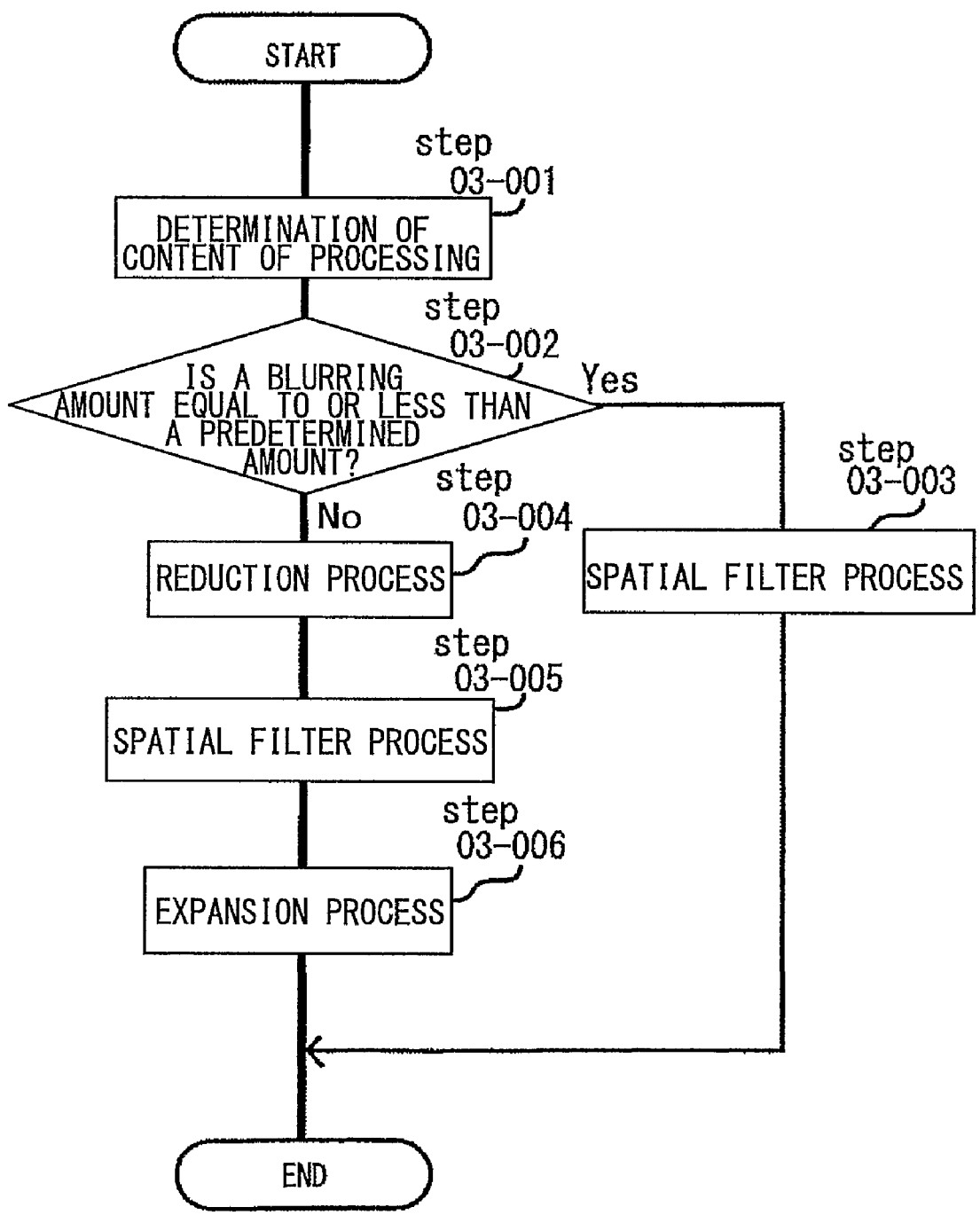

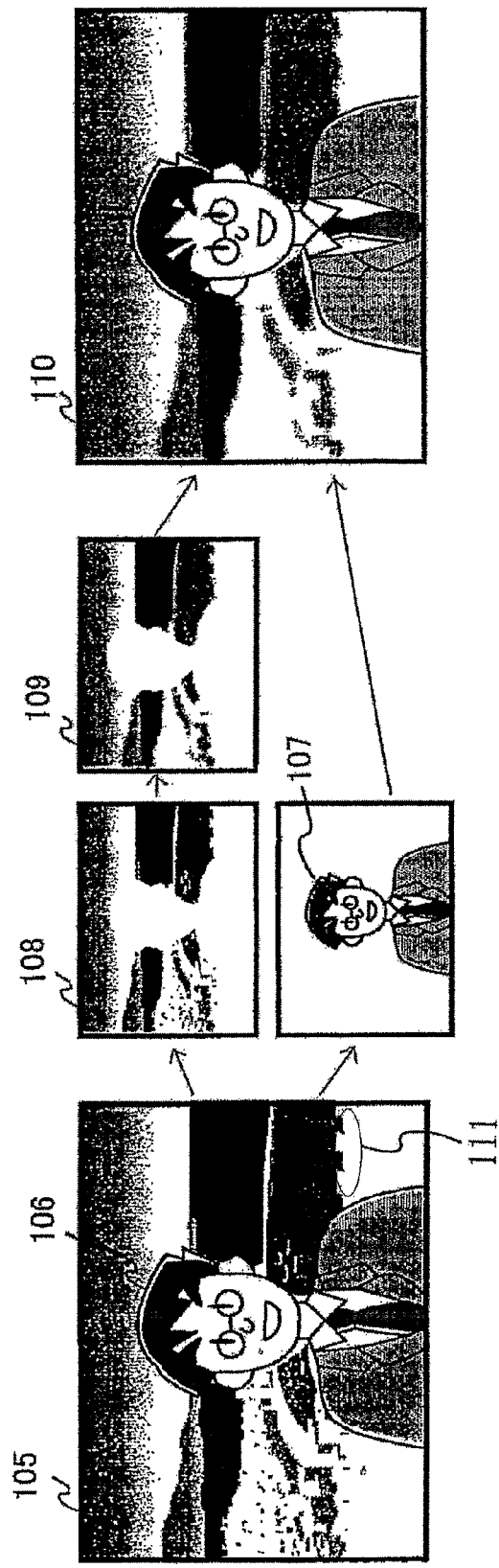

FIG.10B

| | ix → | | | | | |
|---|---|---|---|---|---|---|
| ↓ | 0 | 40 | 80 | 95 | 80 | 40 | 0 |
| iy | 40 | 100 | 100 | 100 | 100 | 100 | 40 |
| | 80 | 100 | 100 | 100 | 100 | 100 | 80 |
| | 95 | 100 | 100 | 100 | 100 | 100 | 95 |
| | 80 | 100 | 100 | 100 | 100 | 100 | 80 |
| | 40 | 100 | 100 | 100 | 100 | 100 | 40 |
| | 0 | 40 | 80 | 95 | 80 | 40 | 0 |

FIG.10C

| | ix → | | | | | |
|---|---|---|---|---|---|---|
| ↓ | 0 | 40 | 80 | 95 | 80 | 40 | 0 |
| iy | 40 | 100 | 100 | 100 | 100 | 100 | 40 |
| | 80 | 100 | 100 | 100 | 100 | 100 | 80 |
| | 95 | 100 | 100 | 100 | 100 | 100 | 95 |
| | 80 | 100 | 100 | 100 | 100 | 100 | 80 |
| | 40 | 100 | 100 | 100 | 100 | 100 | 40 |
| | 0 | 40 | 80 | 95 | 80 | 40 | 0 |

FIG.10D

| | ix → | | | | | |
|---|---|---|---|---|---|---|
| 0 | 50 | 116 | 119 | 116 | 50 | 0 |
| 50 | 116 | 108 | 100 | 108 | 116 | 50 |
| 116 | 108 | 100 | 100 | 100 | 108 | 116 |
| 119 | 100 | 100 | 100 | 100 | 100 | 119 |
| 116 | 108 | 100 | 100 | 100 | 108 | 116 |
| 50 | 116 | 108 | 100 | 108 | 116 | 50 |
| 0 | 50 | 116 | 119 | 116 | 50 | 0 | iy ↓

\# IMAGE PROCESSOR, IMAGE PROCESSING METHOD, DIGITAL CAMERA, AND IMAGING APPARATUS

TECHNICAL FIELD

The present invention relates to an image processor, an image processing method, a digital camera, and an imaging apparatus, each having a function of performing a blurring process on an image.

BACKGROUND ART

Generally, an area of an imaging device used for a so-called compact digital camera is smaller than that of an imaging device used in a single-lens reflex digital camera, or is smaller than an exposure area of a silver-salt film used in a single-lens reflex camera. Thus, a focal distance of the compact digital camera is shorter than that of the single-lens reflex digital camera or the single-lens reflex camera, when the focal distances of photographic optical systems thereof necessary for photographing an image having the same angle of field are compared with each other. In addition, when an F-number of each of the photographic optical systems is set to be constant, a depth of field of the photographic optical system having the shorter focal distance becomes deeper than that of the photographic optical system having the longer focal distance. In other words, the compact camera generally has a characteristic of a deep depth of field.

It is possible to make the depth of field shallow, if the F-number can be made smaller as the focal length becomes shorter. However, a diameter of the photographic optical system must be enlarged when the F-number is to be made small, which is not suitable for the compact camera since size and costs are increased. Thus, the compact digital camera has a characteristic in which a focused state is obtained for a relatively wide distance range. Such a characteristic is advantageous in that an image having reduced blur is obtained in a case where a photographic object of the same brightness is photographed, although the characteristic becomes disadvantageous when photographing is performed in which the background is blurred largely such as in portrait photographing, i.e., an image having large blurring is difficult to obtain.

In order to deal with the characteristic of the compact digital camera, for example, Japanese patent application publication No. H11-266388, No. 2003-37767, No. 2003-101858, and No. H09-318870 each proposes a camera which blurs a background image by utilizing image processing. The camera proposed in each of the publications changes a characteristic of a filter in the image processing according to a distance between a photographic object and the camera, or according to a position of a photographic object in an angle of field, so as to realize blurring having perspective.

DISCLOSURE OF THE INVENTION

However, filter processing having a large number of filter taps is necessary in order to obtain a great effect of blurring only with the image processing utilizing the filter. Therefore, technologies including those disclosed in JP-H11-266388A, JP2003-37767A, JP2003-101858A, and JP-H09-318870A may incur a rise in costs due to the need for a large-scale processing circuit, and may also decrease processing speed.

At least one objective of the present invention is to provide an image processor, an image processing method, a digital camera, and an imaging apparatus, which realize a great effect of blurring by simplified image processing.

(1) To achieve these and other advantages and in accordance with the purpose of the invention, as embodied and broadly described herein, the invention provides an image processor, comprising an image processing section which performs a blurring process on a given image data, the image processing section including: an image data reduction part which reduces the given image data at a predetermined reduction rate to generate a reduced image data; a spatial filter processing part which performs a spatial filter process on the reduced image data reduced by the image data reduction part to generate a processed image data; and an image data expansion part which expands the processed image data processed by the spatial filter processing part at an expansion rate inverse of the reduction rate.

(2) Advantageously, the image processor further comprises a system controller which sets a denominator of the reduction rate at a value of a common divisor of a horizontal size and a vertical size of the given image data.

(3) Advantageously, the image processor further comprises a system controller which: judges whether or not an amount of blurring indicative of a degree of the blurring process is equal to or more than a predetermined value; causes the image processing section to reduce the given image data at the predetermined reduction rate by the image data reduction part, to perform the spatial filter process on the reduced image data by the spatial filter processing part, and to expand the processed image data processed with the spatial filter process at the expansion rate by the image data expansion part, when the amount of blurring is equal to or more than the predetermined value; and causes the image processing section to perform only the spatial filter process on the given image data by the spatial filter processing part, when the amount of blurring is less than the predetermined value.

(4) Advantageously, the image processor further comprises a system controller which changes a characteristic of a spatial filter of the spatial filter process performed by the spatial filter processing part, in accordance with the reduction rate of the image data reduction part.

In addition, the invention provides an image processing method which performs a blurring process on a given image data, the method comprising: reducing the given image data at a predetermined reduction rate to generate a reduced image data; performing a spatial filter process on the reduced image data to generate a processed image data; and expanding the processed image data processed with the spatial filter process at an expansion rate inverse of the reduction rate.

Advantageously, a denominator of the reduction rate is set at a value of a common divisor of a horizontal size and a vertical size of the given image data.

Advantageously, the image processing method further comprises: judging whether or not an amount of blurring indicative of a degree of the blurring process is equal to or more than a predetermined value; and performing only the spatial filter process on the given image data when the amount of blurring is less than the predetermined value, wherein, when the amount of blurring is equal to or more than the predetermined value, the given image data is reduced at the predetermined reduction rate, the reduced image data is processed with the spatial filter process, and the processed image data processed with the spatial filter process is expanded at the expansion rate.

Advantageously, the image processing method further comprises changing a characteristic of a spatial filter of the spatial filter process in accordance with the reduction rate.

Furthermore, the invention provides a digital camera, comprising the image processor according to any one of (1) to (4).

Moreover, the invention provides an imaging apparatus, comprising the image processor according to any one of (1) to (4).

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this description. The drawings illustrate embodiments of the invention and, together with the description, serve to explain the principles of the invention.

FIG. 5B is a flowchart illustrating a blurring process of the digital camera according to the first embodiment.

FIG. 6D is further another explanatory view of image processing of the digital camera according to the first embodiment.

FIG. 10B illustrates another example of the filter coefficients in the digital camera according to the first embodiment.

FIG. 10C illustrates yet another example of the filter coefficients in the digital camera according to the first embodiment.

FIG. 10D illustrates further another example of the filter coefficients in the digital camera according to the first embodiment.

DESCRIPTION OF NUMERALS

Figure 1:
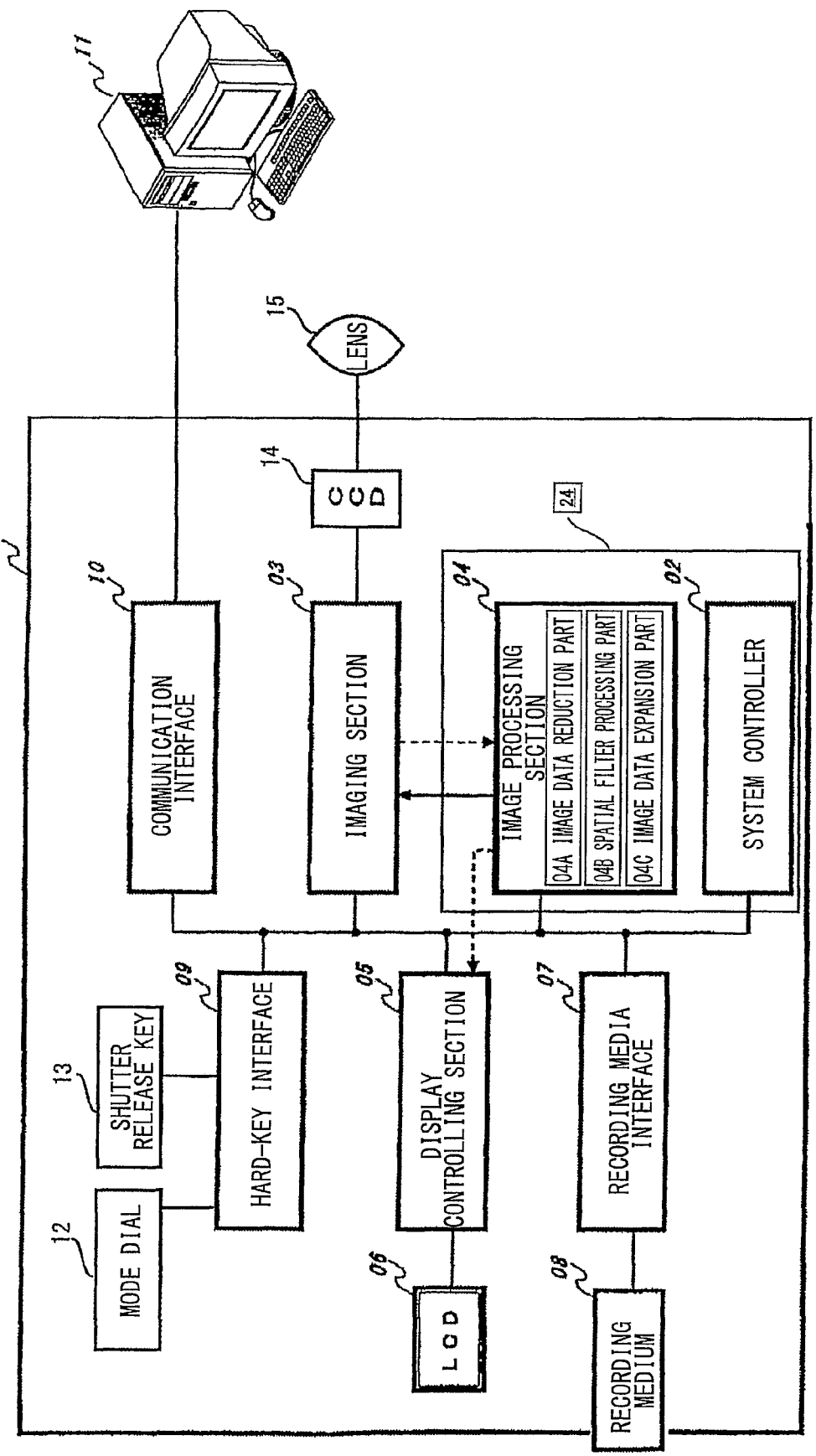
FIG. 1 is a block diagram of a digital camera according to a first embodiment of the present invention.

01 Digital camera
02 System controller
03 Imaging section
04 Image processing section
04A Image data reduction part
04B Spatial filter processing part
04C Image data expansion part
05 Display controlling section
06 Liquid crystal display
07 Recording media interface
08 Recording medium
09 Hard-key interface
10 Communication interface
11 Personal computer
12 Mode dial
13 Shutter release key
14 Charge-Coupled Device
15 Lens
24 Image processor

BEST MODE FOR CARRYING OUT THE INVENTION

Reference will now be made in detail to the present preferred embodiments of the present invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

<First Embodiment>

FIG. 1 schematically illustrates a structure of a digital camera and a connected device according to a first embodiment of the present invention.

Referring to FIG. 1, a digital camera 01 is illustrated. The digital camera 01 includes a system controller 02, and an imaging section 03. The system controller 02 is provided, for example, with a CPU (Central Processing Unit), a NAND flash memory, a SDRAM (Synchronous Dynamic Random Access Memory), and a timer, and is provided for controlling all parts of the digital camera 01. The imaging section 03 is provided, for example, with a motor for driving an imaging optical system, a CCD driving circuit for driving a CCD (Charge-Coupled Device) 14, and an A/D (Analog/Digital) converter.

The digital camera 01 includes an image processing section 04, which applies various image processes to an image signal obtained by the imaging section 03. The image processing section 04 is provided, for example, with an image processing DSP (Digital Signal Processor) and a RAM (Random Access Memory). The image processing DSP, for example, controls the imaging section 03, controls zooming and focusing of the imaging optical system, performs exposure adjustment, and performs compression and expansion of an image.

The digital camera 01 also includes a display controlling section 05, which performs signal processing for displaying the image signal, subjected to the image processes by the image processing section 04, on an LCD (Liquid Crystal Display) 06. The display controlling section 05 generates various graphic images for a user-interface. The display controlling section 05 is provided, for example, with a D/A (Digital/Analog) converter for displaying the generated graphic images, and an on-screen display controller.

The digital camera 01 includes the LCD 06, a recording media interface 07, and a recording medium 08. The LCD 06 displays the graphic images for the user-interface. The recording media interface 07 is provided, for example, with a memory card controller for providing an interface with the recording medium 08. The recording medium 08 includes, for example, a flash memory for storing therein a compressed image signal and information on the image. The recording medium 08 is preferably attachable and detachable to the digital camera 01.

The digital camera 01 further includes a hard-key interface 09, and a communication interface 10. The hard-key interface 09 detects states of user-interface members such as keys and a dial. The hard-key interface 09 is provided, for example, with a sub-CPU for performing control of a main power supply for a main CPU. The communication interface 10 is provided, for example, with a communication controller for data communication, and a USB (Universal Serial Bus) connector for establishing connection with an external device. In the present embodiment, a personal computer 11 is connected with the communication interface 10 through a USB connection, although it is not limited thereto. The personal computer 11 transfers the image photographed by the digital camera thereto to replay thereon, and performs various settings of the digital camera 01.

The digital camera 01 also includes a mode dial 12 for setting photographing modes, a shutter release key 13, a lens 15 for forming an optical image of a photographic object on the CCD 14, and the CCD 14 as an imaging device for converting the optical image of the photographic object into an electrical signal.

Figure 2:
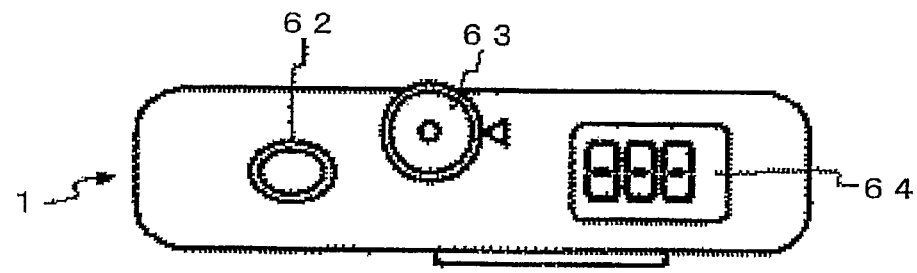
FIG. 2 is a top view of the digital camera according to the first embodiment.
Figure 3:
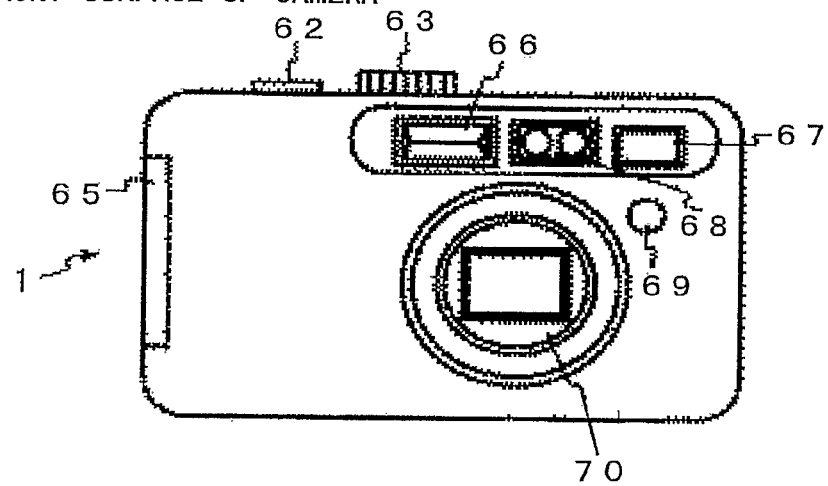
FIG. 3 is a front view of the digital camera according to the first embodiment.
Figure 4:
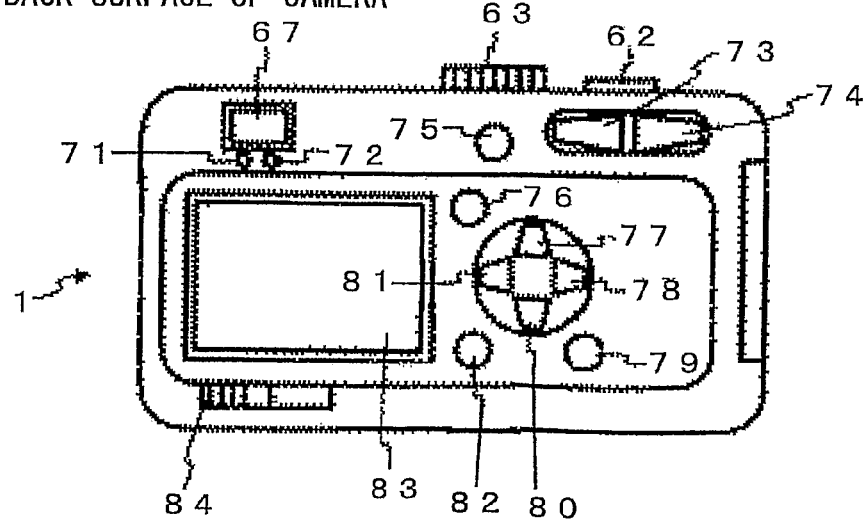
FIG. 4 is a back view of the digital camera according to the first embodiment.

FIG. 2 is a top view, FIG. 3 is a front view, and FIG. 4 is a back view, of the digital camera 01 according to the first embodiment.

In FIGS. 2 to 4, an upper surface of the digital camera 01 is provided with a shutter release button 62 corresponding to the shutter release key 13, a mode dial 63 corresponding to the shutter release key 13, and a sub-LCD 64.

A front surface of the digital camera 01 is provided with an SD card and battery lid 65, a strobe emitting section 66, an optical finder 67, a ranging unit 68, a remote controller light-receiver 69, and a lens barrel unit 70.

A back surface of the digital camera 01 is provided with an AF (Auto Focus) LED (Light-Emitting Device) 71, a strobe LED 72, a zoom switch for wide angle 73, a zoom switch for telephoto 74, a self-timer and delete switch 75, and a menu switch 76. The back surface of the digital camera 01 is also provided with an up and strobe switch 77, a right switch 78, a display switch 79, a down and strobe switch 80, a left and image confirmation switch 81, an OK switch 82, an LCD monitor 83, and a power switch 84. The back surface of the digital camera 01 is further provided with an optical finder 67. The optical finder 67 is fixed so that the optical finder 67 is inserted from the front surface to the back surface of the digital camera 01.

Now, basic operation on activation of the digital camera 01 according to the present embodiment will be described. The hard-key interface 09 initiates supplying of power to the main CPU when a user operates the power switch 84. The main CPU within the system controller 02, first, initiates access or executes programs from a boot section of the NAND flash memory, and transfers programs and data to the SDRAM by a boot program. When the transfer of the programs and data to the SDRAM is completed, execution pointers of the programs or program counters are moved to the programs transferred on the SDRAM. Thereafter, activation processing is initiated by the program on the SDRAM.

The activation processing includes, for example, initialization of an OS (Operating System), a protruding process of the lens barrel 70, and an initialization process of the recording medium 08. The protruding process of the lens barrel 70 may be performed by applying a pulse signal to the motor of the imaging section 03 through the image processing section 04 for each predetermined interval, such as 2 mS. The initialization process of the recording medium 08 is performed by issuing an initialization command to the recording medium 08, after current and clock are supplied to the recording medium 08 through the recording media interface 07. The actual initialization process is performed within the recording medium 08. The system controller 02 performs polling of a status of the recording medium 08 at an interval of 10 mS, for example, in order to detect completion of the initialization process in the recording medium 08.

Next, operation at the time of photographing will be described. Prior to photographing, the user operates the various kinds of keys, switches, and the dial illustrated in FIGS. 2 to 4 so as to select one of the photographing modes including, for example, a high image quality mode, a low image quality mode, and so on. A content of operation by the user is judged by the system controller 02 through the hard-key interface 09. The system controller 02 generates guidance graphics according to the operation of the user and outputs the generated guidance graphics to the display controller 05, to give guidance to the user for subsequent operation. When the photographing mode is decided, the system controller 02 sets process parameters to the image processing section 04, in accordance with the determined photographing mode.

When the user operates the zoom switches 73 and 74 to decide an angle of field or picture composition, that contents of operation by the user is judged by the system controller 02 through the hard-key interface 09. The system controller 02 controls the imaging section 03 in accordance with the operation by the user to drive the lens 15. The imaging section 03, prior to the actual photographing, initiates an imaging operation for displaying a monitoring image on the LCD 06, in accordance with the control from the image processing section 04. Here, monitoring may sometimes be referred to as a live view, in which a state of the photographic object before photographing is displayed on the LCD 06 in real time.

Image data imaged by the imaging section 03 are continuously sent to the image processing section 04. The image processing section 04 applies image processes such as color space conversion, gamma correction, and white balance adjustment to the image data, and then sends the processed image data to the display controlling section 05. The display controlling section 05 performs a signal process on the image data and outputs the image data subjected to the signal process to the LCD 06, so as to present a state of imaging to the user as monitoring or a live view. When the shutter release button 62 is operated by the user, that user's operation is judged by the system controller 02 through the hard-key interface 09.

Then, the imaging section 03 performs focusing in accordance with the control from the image processing section 04, and sends the image data obtained by the CCD 14 to the image processing section 04. The image processing section 04 performs the image process and the compression process according to the photographing mode. The system controller 02 reads the compressed image data from the image processing section 04, adds header information thereto, and then writes the image data on the recording medium 08 through the recording media interface 07. Thereby, a series of photographing operations is completed.

Figure 5A:
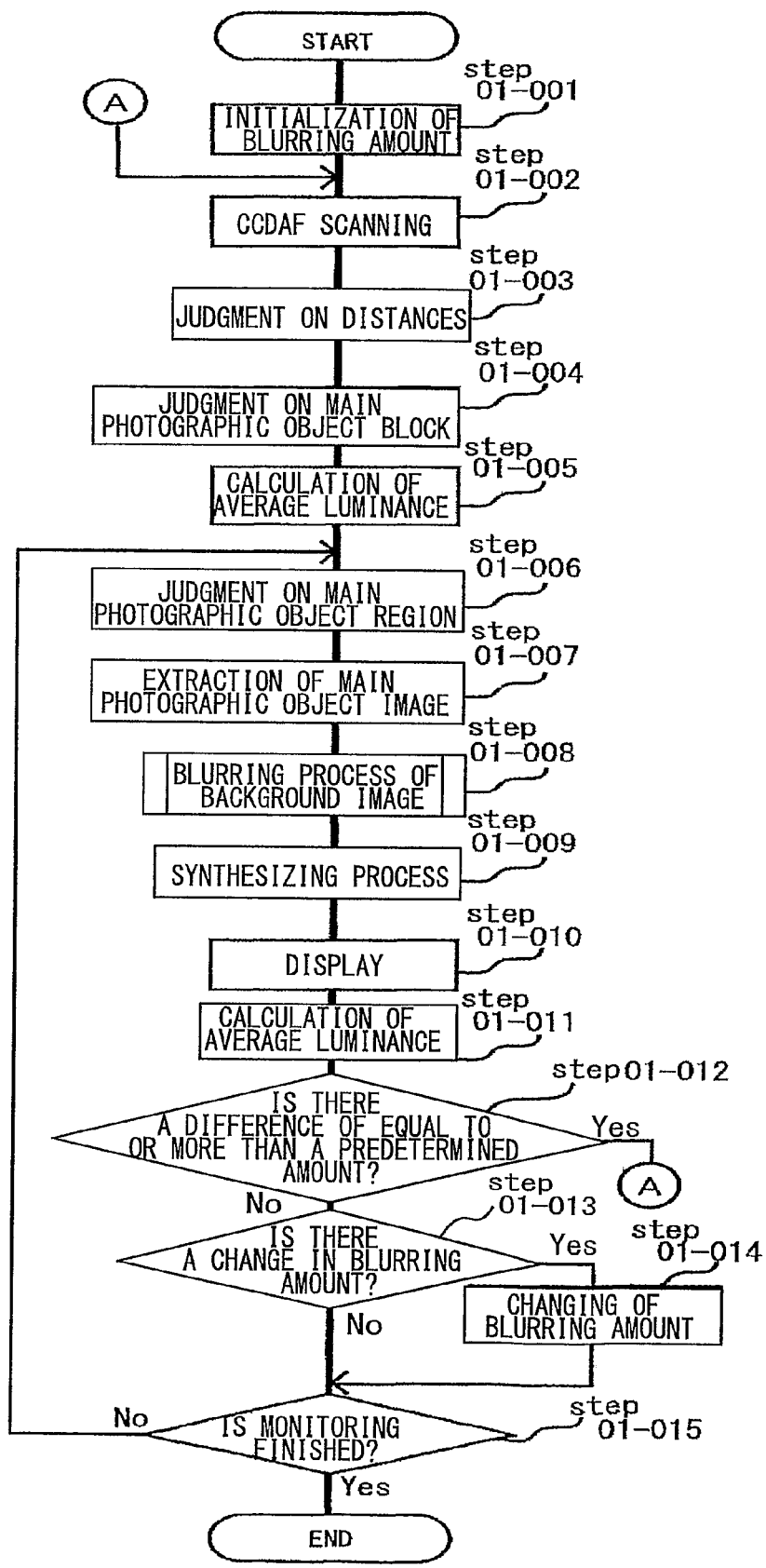
FIG. 5A is a flowchart illustrating a flow of operation of the digital camera according to the first embodiment.

Now, a blurring process according to the present embodiment, which changes an amount of blurring in a background part of an image in accordance with operation by the user will be described. FIG. 5A is a flowchart illustrating a flow of operation of the digital camera according to the first embodiment. Specifically, the flowchart of FIG. 5A illustrates a flow of the blurring process during the monitoring or the live view of the photographic object.

When the monitoring or the live view operation of the photographic object is initiated, the system controller 02 sets a parameter on the amount of blurring or a blurring amount parameter, which will be described later in greater detail, at an initial value, for example, of 5 (step 01-001). Then, the system controller 02 controls the image processing section 04 and the imaging section 03 to perform a later-described CCDAF scanning operation (step 01-002). Thereafter, the system controller 02 judges a distance for each position in the image (step 01-003).

Here, the CCDAF operation will be briefly described. Generally, an electronic imaging apparatus having a two-dimensional imaging device, such as a digital camera, a video camera and so on, detects contrast of a screen on the basis of a picture signal photo-electrically converted by the imaging device, and controls a position of a focusing lens in such a manner that the contrast becomes maximum, to adjust a focal point. Normally, the contrast is small in a state in which the focal point is not brought into focus, and the contrast becomes larger as the focal point is brought nearer into focus. The contrast reaches the maximum value in a state in which the focal point is completely brought into focus.

The CCDAF scanning operation is a method in which a position of the focusing lens is gradually moved from an infinite end to a proximate end and at the same time the photographic object is imaged at the plural positions, and in which a position of the focusing lens where an image having the highest contrast is obtained within the imaged plural image data is defined as the in-focus position or a focusing position.

Figure 6A:
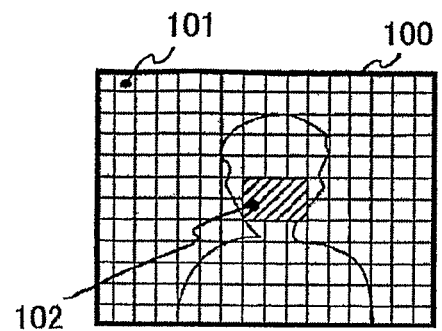
FIG. 6A is an explanatory view of image processing of the digital camera according to the first embodiment.

Next, the CCDAF scanning operation will be described with reference to FIGS. 6A to 6D. In FIG. 6A, reference numeral 100 denotes a photographing region of a monitoring image, and reference numeral 101 denotes one area of an AF (Auto Focus) evaluation value or an AF evaluation value area. Referring to FIG. 6A, the AF evaluation value area is a small region in which the photographing region is divided evenly. The CCDAF scanning operation obtains the AF evaluation value of each of the regions, i.e., an integration value of contrast of the image within the regions. The system controller 02 analyzes, on the basis of a predetermined algorithm, the AF evaluation value of each of the positions of the lens obtained by the CCDAF scanning operation performed for each of the regions, and judges the position of the focusing lens where a peak of the AF evaluation value is obtained. In addition, the system controller 02 calculates, on the basis of driven positions of the focusing lens, information on distance between the photographic object and the digital camera 01 for each of the regions.

Figure 7:
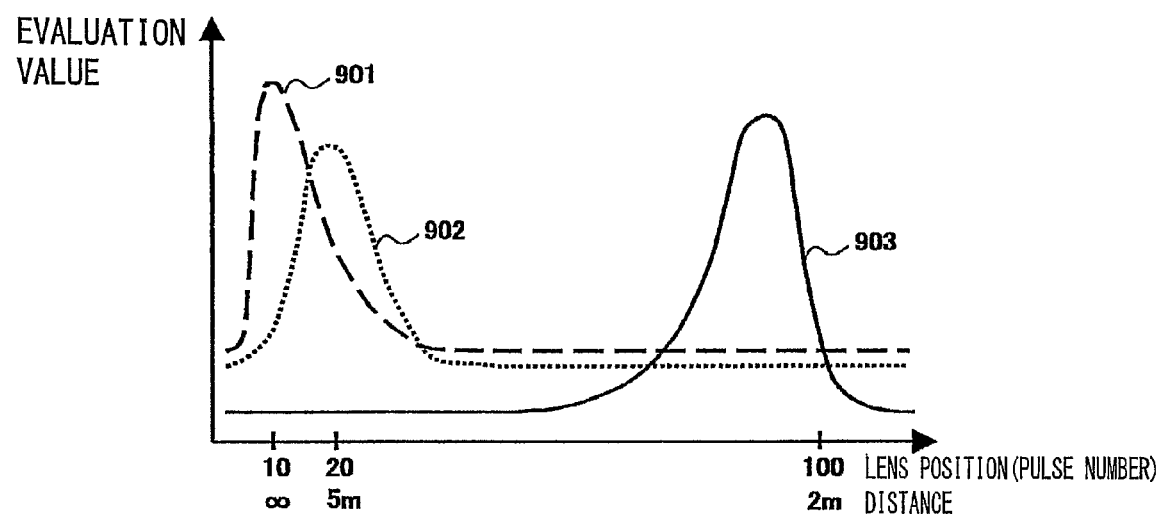
FIG. 7 illustrates a relationship between AF (Auto Focus) evaluation values and distances of a photographic object in the digital camera according to the first embodiment.

FIG. 7 illustrates one example of a relationship between positions of the focusing lens, i.e., focusing distance, and the AF evaluation values in the CCDAF scanning operation according to the first embodiment. Referring to FIG. 7, a horizontal axis represents the focusing lens position and the focusing distance corresponding to the focusing lens position, and a vertical axis represents the AF evaluation value. A curved line 901 represents a change in the AF evaluation value in accordance with the CCDAF scanning operation corresponding to a photographic object located at a long distance position such as a mountain part in the background denoted as 105 in FIG. 6D. A curved line 902 represents a change in the AF evaluation value in accordance with the CCDAF scanning operation corresponding to a photographic object located at a middle distance position such as a curbstone 111 in the background denoted as 105 in FIG. 6D. A curved line 903 represents a change in the AF evaluation value in accordance with the CCDAF scanning operation corresponding to a photographic object located at a short distance position such as a person part in FIG. 6D.

Here, the AF evaluation value is a value in which HPF (High Pass Filter) calculation between pixels in a horizontal direction is performed for each pixel within the AF evaluation value area, and in which thus-obtained high frequency components are added. In the present embodiment, coefficients Ki for the HPF calculation are, for example, values such as:

$Ki=\{-1,-2,6,-2,-1\}$ ($i$=1-5)

Here, for example, k1 is a coefficient to be multiplied to a pixel located in a coordinate of −2 (minus two) in a horizontal direction of a pixel of interest, k2 is a coefficient to be multiplied to a pixel located in a coordinate of −1 (minus one) in the horizontal direction of the pixel of interest, and k3 is a coefficient to be multiplied to the pixel of interest. In addition, for example, K4 is a coefficient to be multiplied to a pixel located in a coordinate of +1 (plus one) in the horizontal direction of the pixel of interest, and K5 is a coefficient to be multiplied to a pixel located in a coordinate of +2 (plus two) in the horizontal direction of the pixel of interest.

Figure 8:
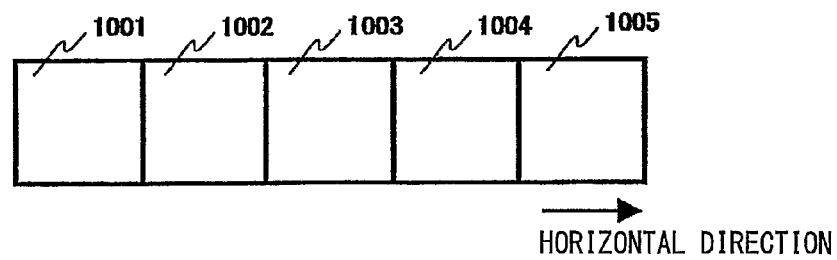
FIG. 8 explains calculation of the AF evaluation value in the digital camera according to the first embodiment.

FIG. 8 explains the calculation of the AF evaluation value in the digital camera according to the first embodiment. Specifically, FIG. 8 illustrates a state in which five pixels in the AF evaluation value area are taken out. Referring to FIG. 8, reference numeral 1001 denotes a pixel in a coordinate of −2 (minus two) in a horizontal direction of an pixel of interest, reference numeral 1002 denotes a pixel in a coordinate of −1 (minus one) in the horizontal direction of the pixel of interest, reference numeral 1003 denotes the pixel of interest, reference numeral 1004 denotes a pixel in a coordinate of +1 (plus one) in the horizontal direction of the pixel of interest, and reference numeral 1005 denotes a pixel in a coordinate of +2 (plus two) in the horizontal direction of the pixel of interest.

For example, an AF evaluation value is obtained by Formula 1 as follows.

$AF$ evaluation value$=K1 \times C(1)+K2 \times C(2)+K3 \times C(3)+K4 \times C(4)+K5 \times C(5)$   Formula 1 where C(1), C(2), C(3), C(4), and C(5) represent contrast values of the pixels 1001, 1002, 1003, 1004, and 1005, respectively.

In order to calculate a distance "a" between the photographic object and the focusing lens on the basis of the calculated AF evaluation value, Formula 2 as follows in which a Gauss' imaging equation of (1/a+1/b=1/f) is deformed is used.

$a=b \times f/(b-f)$   Formula 2 where "b" is a distance between a focusing lens and an imaging device, which is uniquely obtained from a position of the focusing lens at which the AF evaluation value becomes peak. In addition, "f" is a focal distance of the focusing lens, which is uniquely obtained from a zoom position at the time of photographing. By the Formula 2, the distance between the photographic object and the focusing lens is obtained for each of the AF evaluation value areas 101.

Figure 6B:
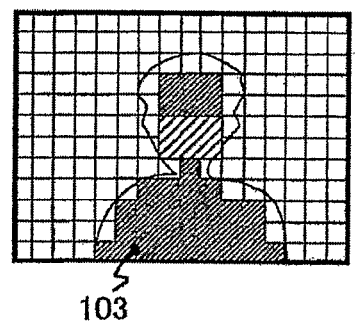
FIG. 6B is another explanatory view of image processing of the digital camera according to the first embodiment.

Referring to FIG. 6A, reference numeral 102 denotes an AF (Auto Focus) area in which focusing is performed by auto-focus. In FIG. 5A, the system controller 02 collectively judges the distance between the photographic object in the AF area and the focusing lens (hereinafter referred to as a photographic object distance), and the AF evaluation value area within a predetermined distance relative to the photographic object distance, as a main photographic object block (step 01-004). In FIG. 6B, reference numeral 103 denotes the main photographic object block. The main photographic object block 103 includes the AF area 102.

Figures 9, 10A:
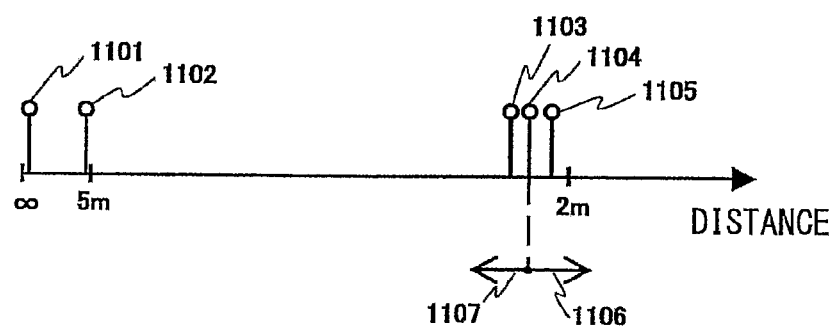
FIG. 9 explains the photographic object distances and predetermined distances in the digital camera according to the first embodiment.
FIG. 10A illustrates an example of filter coefficients in the digital camera according to the first embodiment.

Now, the photographic object distance and the predetermined distance for deciding the main photographic object block will be described with reference to FIG. 9. FIG. 9 explains the photographic object distances and predetermined distances in the digital camera according to the first embodiment. In FIG. 9, a horizontal axis represents a distance from infinity toward a near distance. Reference numerals 1101-1105 denote the photographic object distances relative to the photographic object 105 illustrated in FIG. 6D obtained by the steps 01-002 and 01-003 in FIG. 5A, respectively. In addition, reference numeral 1101 denotes the photographic object distance relative to the mountain part of the background part 105, reference numeral 1102 denotes the photographic object distance relative to the curbstone part 111 of the background 105, and reference numeral 1103 denotes the photographic object distance relative to a head part of the person. Also, reference numeral 1104 denotes the photographic object distance relative to a face part of the person, and reference numeral 1105 denotes the photographic object distance relative to a chest part of the person.

As illustrated in FIG. 6A, the AF area 102 is set to the face part of the person, and the photographic object distance within the AF area 102 is equal to the photographic object distance 1104. In FIG. 9, reference numerals 1106 and 1107 denote the predetermined distances or a predetermined range for deciding the main photographic object block, in which the reference numeral 1106 denotes a distance on a side of the focusing lens, i.e., a near distance side, and the reference numeral 1107 denotes a distance on a side of the photographic object, i.e., a long distance side. In FIG. 9, the photographic object distances 1103, 1104, and 1105 are included within the predetermined distances. Based on the judgment described above, the area 103 illustrated in FIG. 6B is judged as the main photographic object block.

The predetermined distances 1106 and 1107 are, for example, set by referring to a table stored in the system controller 02, on the basis of the focal distance of the focusing lens and the photographic object distance of the AF area. The predetermined distances are set to be short when the focal distance of the focusing lens is long, whereas the predetermined distances are set to be long when the focal distance of the focusing lens is short. In addition, the predetermined distances are set to be long when the photographic object distance for the AF area is long, whereas the predetermined distances are set to be short when the photographic object distance for the AF area is short.

Referring to FIG. 5A, at this time, the system controller 02 calculates average luminance of image data in each of the pixels within the main photographic object block 103, and stores the calculated average luminance (step 01-005). The system controller 02 judges a main photographic object region, on the basis of information on the obtained main photographic object block 103 and the imaged image (step 01-006). The judgment on the main photographic object region performs contour definition or contour extraction to determine a region including the main photographic object block 103.

Figure 6C:
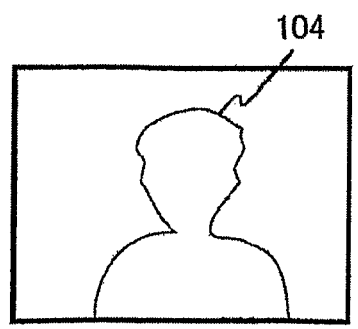
FIG. 6C is yet another explanatory view of image processing of the digital camera according to the first embodiment.

In FIG. 6C, reference numeral 104 denotes the main photographic object region. Referring to FIG. 5A, the image processing section 04, on the basis of information on the main photographic object region 104, sequentially performs an extraction process of a main photographic object image, a blurring process of a background image, and a synthesizing process of the main photographic object image and the background image subjected to the blurring process (steps 01-007 to 01-009). In FIG. 6D, the photographing image 105, the main photographic object 106, the extracted main photographic object image 107, the background image 108, the background image after the blurring process 109, and the synthesized image 110 of the main photographic object image 107 and the background image after the blurring process 109, are illustrated.

In the extraction process of the main photographic object (step 01-007), an image is separated along the main photographic object region 104 to perform extraction of the main photographic object. As a result, the photographing image 105 is separated into the main photographic object image 107 and the background image 108.

In the blurring process of the background image (step 01-008), the blurring process based on the blurring amount parameter is applied to the background image 108, to generate the blurred background image 109.

Now, the blurring process will be described in greater detail on the basis of a flow illustrated in FIG. 5B. FIG. 5B is a flowchart illustrating the blurring process of the digital camera according to the first embodiment. For example, the system controller 02 decides one of processing contents listed in exemplary Table 1 on the basis of the blurring amount parameter (step 03-001).

TABLE 1

<Processing Contents based on Amount of Blurring>

| Blurring Amount | Reduction Process | Filter Type |
|---|---|---|
| 2-7 | None | A |
| 8-14 | 8/16 | A |
| 15-28 | 4/16 | A |
| 29-56 | 2/16 | B |
| 57-112 | 1/16 | B |

In Table 1, "Blurring Amount" represents a value of the blurring amount parameter for determining a degree or magnitude of the blurring, in which a greater effect of blurring is generated as the value becomes larger. The "Reduction Process" represents a reduction rate of the reduction process, i.e., a ratio of length of one side of an image, determined on the basis of the value of the blurring amount parameter. The "Filter Type" represents a type of filter of a later-described spatial filter process, i.e., type A or type B for example.

For example, the blurring amount parameter is an integer value ranging from 2-112, and is equivalent, when a point image consisting of one pixel is applied with the blurring process, to the number of pixels which a diameter of the point image occupies.

For example, the reduction process performs a sampling process according to a bi-linear method in such a manner that the number of pixels of an image is decreased. In the present embodiment, a value of a denominator of the reduction rate in the reduction process is set at a value based on a common divisor of a horizontal size and a vertical size of the image, such as 16 for example, by which a size of the image after the reduction does not generate a fractional figure equal to or below the integer number for both the horizontal direction and the vertical direction. Hence, an error due to fraction rounding in the reduction process or in an expansion process is eliminated, and thus matching of an image size after reduction and expansion to an image size of an original image is possible, accurately. Therefore, it is possible to improve image quality after the synthesizing process, which will be described later in detail.

Referring to FIG. 5B, the reduction process is preferably not carried out and only the spatial filter process is performed, when the value of the blurring amount parameter is equal to or less than a predetermined amount (steps 03-002 and 03-003). In the present embodiment, the spatial filter process is executed by the image processing section 04 on the basis of a setting in the system controller 02, and the spatial filter process performs calculation on the basis of a filter coefficient (k(ix, iy)) and an input image (In(x, y)), so as to obtain an output image (Out(x, y)), as represented by the following Formula 3.

$$\text{Out}(x, y) = \frac{\left(\sum_{iy=0}^{fs-1} \sum_{ix=0}^{fs-1} k(ix, iy) \text{ In}\begin{pmatrix} x + ix - fs/2, \\ y + iy - fs/2 \end{pmatrix}\right)}{\sum_{iy=0}^{fs-1} \sum_{ix=0}^{fs-1} k(ix, iy)} \quad \text{Formula 3}$$

where In represents the input image, Out represents the output image, K represents the filter coefficient, and fs represents a size of a filter. In the present embodiment, the filter size is 7, for example.

FIGS. 10A to 10D illustrate examples of the filter coefficients in the digital camera according to the first embodiment. FIG. 10A illustrates the filter coefficients in an example in which the value of the blurring amount parameter is 2, and the example has an effect of blurring equivalent to a state in which the number of pixels in a diameter after the blurring process is 2. The number of pixels of a diameter after the blurring process is synonymous with a degree or intensity of the apparent blurring effect, and an image having the stronger blurring effect is generated as the value of the blurring amount parameter becomes greater. In FIGS. 10A to 10D, a circle indicated by an undulating line represents a size of an image after the blurring effect. FIG. 10B illustrates the filter coefficients in an example in which the value of the blurring amount parameter is 7. The system controller 02 sets such filter coefficients in which the number of pixels of a diameter after the blurring process becomes equal to a value of the blurring amount parameter, to perform the blurring process.

Referring to FIG. 5B, when the value of the blurring amount parameter is equal to or more than the predetermined amount, an image is once subjected to the reduction process and is then applied with the spatial filter process, and is, thereafter, subjected to the expansion process to bring the image back to the original size (steps 03-004 to 03-006). The expansion process expands the reduced image according to the reciprocal of the reduction rate performed in the step 03-004. In other words, image data applied with the spatial filter process is expanded at an expansion rate inverse of the reduction rate. As a result, a size of the reduced image becomes the original size. The expansion process performs a sampling process according to the bi-linear method in such a manner that the number of pixels of the image is increased.

The reduction process, the spatial filter process, and the expansion process are executed by the image processing section 04 on the basis of the setting of the system controller 02. Specifically, the image processing section 04 includes an image data reduction part 04A, a spatial filter processing part 04B, and an image data expansion part 04C. The filter coefficients of the blurring process accompanied with the reduction process are set so that the number of pixels of a diameter after the blurring process becomes equal to a value of:

(Value of blurring amount parameter)×(Reduction rate)

FIG. 10C illustrates the filter coefficients in an example in which the value of the blurring amount parameter is 28, in which the number of pixels of a diameter after the blurring process is:

(28)×(4/16)=7

Now, the filter type A and the filter type B of the spatial filter process will be described. The filter coefficients illustrated in FIGS. 10A to 10C are categorized into the filter type A. On the other hand, the filter coefficients illustrated in FIG. 10D are categorized into the filter type B. FIG. 10D illustrates the filter coefficients in an example in which the value of the blurring amount parameter is 56, in which the number of pixels of a diameter after the blurring process is:

(56)×(2/16)=7

Thus, according to the filter coefficients illustrated in FIG. 10D, the number of pixels of the diameter after the blurring process is equal to the filter coefficients of the example in which the value of the blurring amount parameter is 28. However, in the filter coefficients illustrated in FIG. 10D, coefficients in a doughnut-like part surrounded by two circles indicated by undulating lines are set at large values, thereby avoiding deterioration in visibility of the image accompanied by the reduction process of the image. Thus, the effect of blurring in the center of the image becomes weak, by which an overview of a photographic object before the blurring process remains and the visibility improves. Therefore, it is possible to obtain the effect of blurring equivalent to that in a case in which an image is optically blurred.

Referring to FIG. 5A, in the synthesizing process (step 01-009), the background image 109 applied with the blurring process is matched with the main photographic object image 107 to synthesize the images, so as to generate the synthesized image 110. The thus-generated synthesized image 110 is displayed on the LCD 06 through the display controlling section 05 (step 01-010).

The processing for the monitoring image for one frame is completed by the aforementioned description. At this time, the system controller 02 calculates average luminance of image data in each of the pixels within the main photographic object block 103 (step 01-011), and compares the calculated average luminance with the value calculated and stored in the step 01-005. When there is a difference of equal to or more than a predetermined amount therebetween, a flow moves on to the CCDAF scanning operation again (step 01-012).

In a case in which operation for changing the blurring amount is performed, the blurring amount parameter is changed according to the operation (steps 01-013 and 01-014), and the above-described processes are repeatedly executed from the step 01-006 to the completion of the monitoring operation (step 01-015). When the shutter release button 62 is operated, the blurring process similar to that according to the steps 01-006 to 01-009 is performed on a scanned photographing image, and the image in which the background is blurred is recorded. The blurring amount parameter at that time or at the time of photographing is obtained, for example, by compensating the blurring amount parameter at the time of the monitoring with a ratio of a horizontal image size (the number of pixels) of the photographing image to a horizontal image size of the monitoring image, as represented by Formula 4 below:

(Blurring amount parameter at the time of photographing)=(Blurring amount parameter at the time of monitoring)×(Horizontal image size of photographing image)/(Horizontal image size of monitoring image)  Formula 4

In the Formula 4, calculation is performed on the basis of the ratio of image size of the photographing image to the monitoring image, i.e., the image size of the photographing image and the image size of the monitoring image are multiplied, in order to compensate the blurring amount parameter at the time of the monitoring to an appropriate amount, as the blurring amount parameter at the time of the photographing. Specifically, the blurring amount parameter of the photographing image having a different image size is calculated based on the blurring amount parameter used suitably for the monitoring image. Hence, it is possible to obtain the photographing image having the suitable effect of blurring.

<Second Embodiment>

Next, a second embodiment of the present invention will be described with reference to FIGS. 11 and 12. The second embodiment obtains a photographic object distance in each region including a photographic object and a background part, and changes an amount of blurring according to the photographic object distance in each of the regions.

Figure 11:
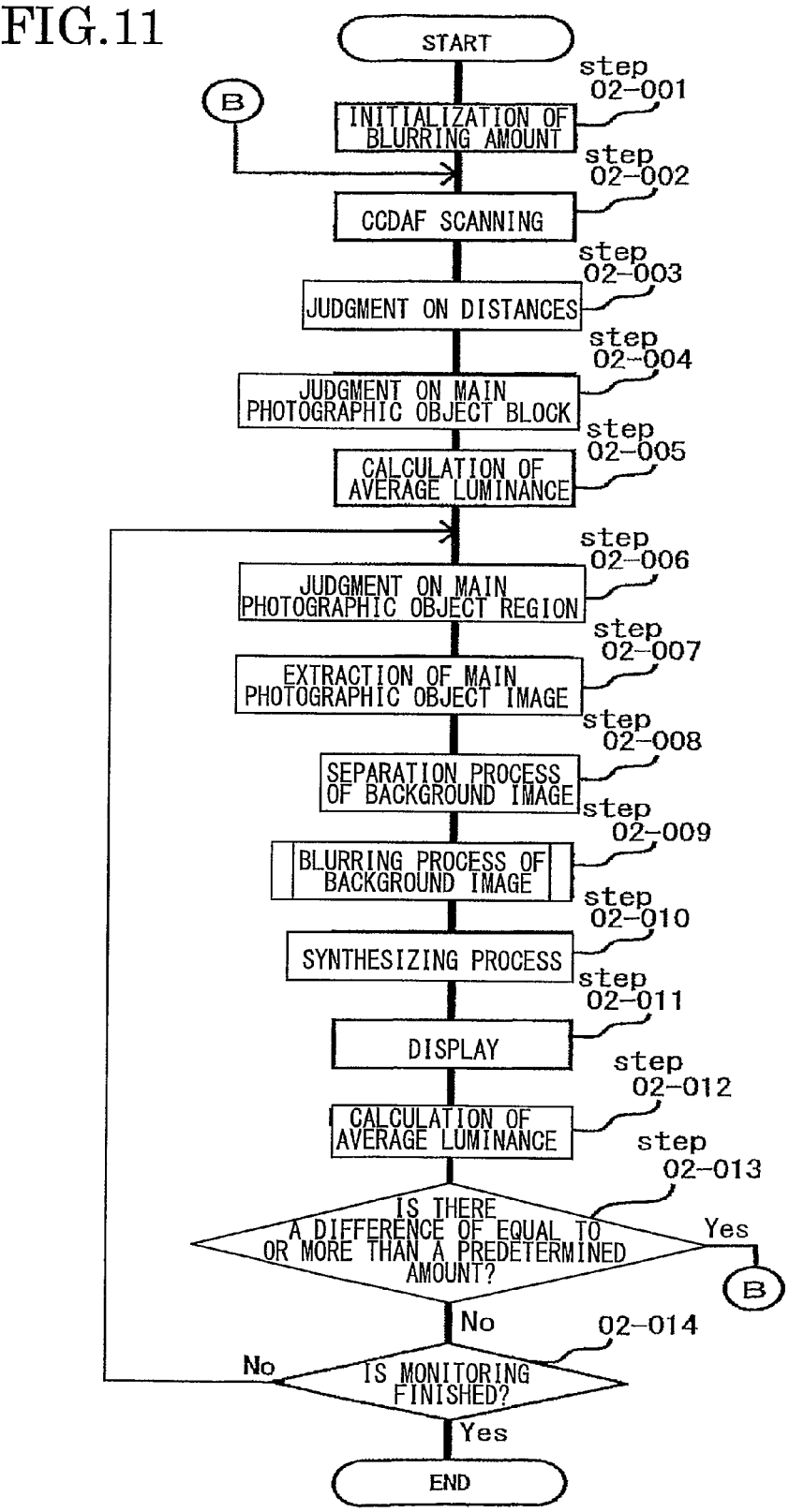
FIG. 11 is a flowchart illustrating a flow of operation of a digital camera according to a second embodiment of the invention.

FIG. 11 is a flowchart illustrating a flow of operation of a digital camera according to the second embodiment of the invention. In FIG. 11, steps 02-001 to 02-007 are similar to the steps 01-001 to 01-007 of FIG. 5A, so they will not be described in detail. The image processing section 04 divides a background image into plural parts on the basis of photographic object distances (step 02-008).

Figure 12:
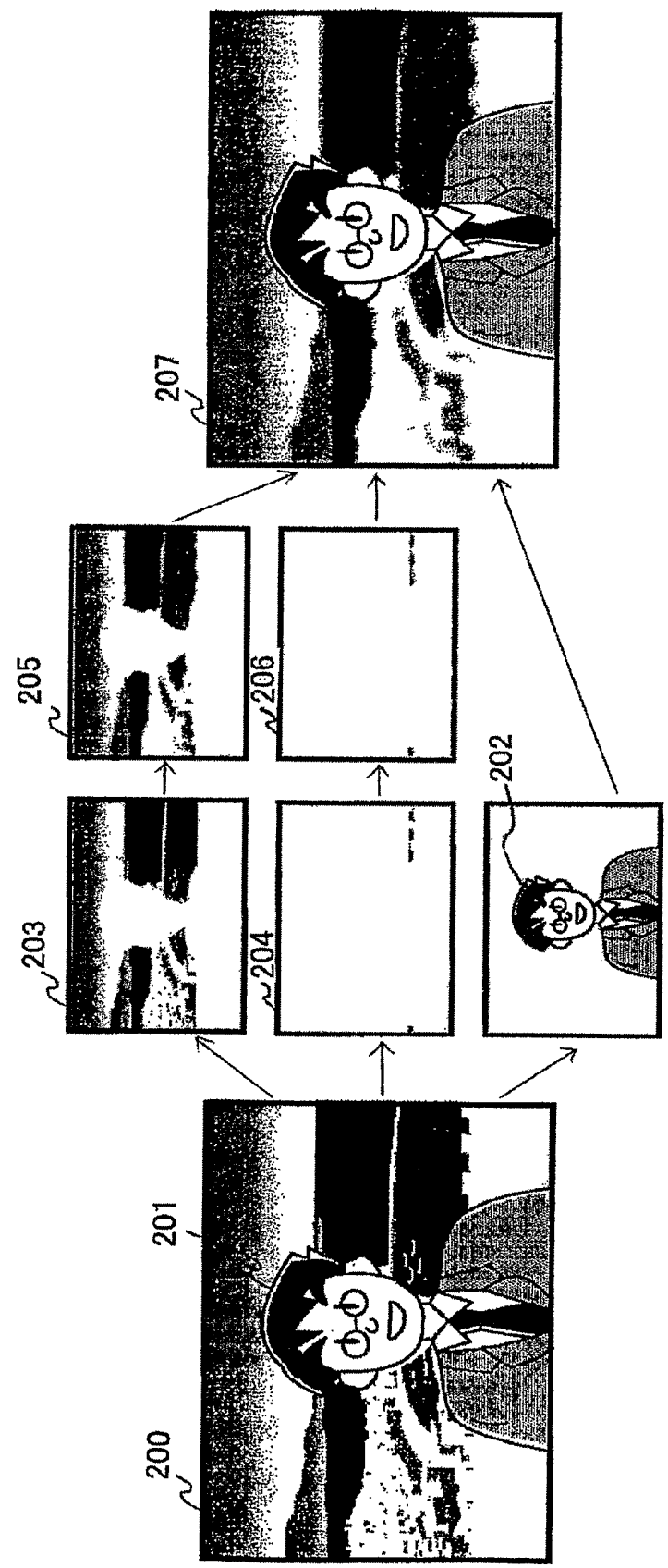
FIG. 12 explains image processing of the digital camera according to the second embodiment.

FIG. 12 explains image processing of the digital camera according to the second embodiment, in which the background image is divided into several parts. Referring to FIG. 12, a photographing image 200, a main photographic object 201, an extracted main photographic object image 202, a background image of a long distance 203, a background image of a short distance 204, a background image of the long distance after a blurring process 205, a background image of the short distance after the blurring process 206, and a synthesized image 207 of the main photographic object image 202, of the background image 205 of the long distance after the blurring process, and of the background image 206 of the short distance after the blurring process, are illustrated. In the present embodiment, the image processing section 04 performs the blurring process for each of the background image for the long distance 203 and the background image for the short distance 204, in accordance with the blurring amount corresponding to the photographic object distance (step 02-009).

In the present embodiment, a blurring amount parameter Bp according to the photographic object distance is determined by the following Formula 5:

$$Bp = K \times f \times |(a'-a)|/(a'a)$$  Formula 5

(round up after the decimal point)
where a' represents the photographic object distance relative to the background on which the blurring process is performed, "a" represents the photographic object distance relative to a focused photographic object, "f" represents a focal distance of a focusing lens, and "K" represents a coefficient determined by an imaging device, an aperture stop and so on (for example, 1.2E3). For example, the blurring process is not performed when a value of the blurring amount parameter Bp is less than 2.

In the synthesizing process (step 02-010), the image 205 of the background located in the long distance applied with the blurring process is matched with the image 206 of the background located in the short distance applied with the blurring process, and is further matched with the main photographic object image 202 to synthesize the images, so as to generate the synthesized image 207. In FIG. 11, steps 02-011 to 02-013 are similar to the steps 01-010 to 01-012 of FIG. 5A, so they will not be described in detail.

In the aforementioned embodiments, the blurring amount parameter in which the monitoring image is used as a criteria is set, and the compensation is performed according to the ratio of the horizontal image size of the photographing image to the horizontal image size of the monitoring image, when the blurring process is performed on the photographed image. In one embodiment, the blurring amount parameter on the basis of the photographing image is set, and the blurring amount parameter applied to the monitoring image is obtained by the following Formula 6.

(Blurring amount parameter at the time of monitoring)=(Blurring amount parameter at the time of photographing)×(Horizontal image size of monitoring image)/(Horizontal image size of photographing image)  Formula 6

When the digital camera 01 includes selectable photographing modes for different image sizes, the blurring amount parameter may be set on the basis of the maximum size of photographing image, and the blurring amount parameter applied to the monitoring image may be obtained from the following Formula 7, and further the blurring amount parameter applied to the photographing image may be obtained from the following Formula 8.

(Blurring amount parameter at the time of monitoring)=(Blurring amount parameter of maximum photographing image size)×(Horizontal image size of monitoring image)/(Horizontal image size of maximum photographing image)  Formula 7

(Blurring amount parameter at the time of photographing)=(Blurring amount parameter of maximum photographing image size)×(Horizontal image size of photographing image)/(Horizontal image size of maximum photographing image)  Formula 8

In addition, as in the processing flow illustrated in the steps 03-002 to 03-006 of FIG. 5B, changing over, on the basis of the value of the blurring amount parameter after the compensation, between the operation of performing only the spatial filter process without performing the reduction process and the operation of performing the spatial filter process after the reduction process, may also be carried out when performing the spatial filter process.

Furthermore, the predetermined distances for determining the main photographic object block are set based on the focal distance of the lens and the photographic object distance of the AF area. Alternatively, the compensation may be performed on the basis of the value of the blurring amount parameter. According to one embodiment, the predetermined distances are set to be short when the value of the blurring amount parameter is large, whereas the predetermined distances are set to be long when the value of the blurring amount parameter is small, in accordance with the value of the blurring amount parameter.

Accordingly, it is possible to extract the following (1) to (10) from the above-described exemplary embodiments of the present invention.

(1) An image processor, comprising an image processing section which performs a blurring process on a given image data, the image processing section including: an image data reduction part which reduces the given image data at a predetermined reduction rate to generate a reduced image data; a spatial filter processing part which performs a spatial filter process on the reduced image data reduced by the image data reduction part to generate a processed image data; and an image data expansion part which expands the processed image data processed by the spatial filter processing part at an expansion rate inverse of the reduction rate.

Accordingly, since the blurring process is performed through the reduction, the spatial filter processing, and the expansion of the image data, a burden on the filter processing is reduced. Therefore, it is possible to provide an image processor which realizes a great effect of blurring by simplified image processing. Specifically, it is possible to perform the blurring process having a great effect, without incurring a rise in costs and without decreasing processing speed.

(2) The image processor according to (1), further comprising a system controller which sets a denominator of the reduction rate at a value of a common divisor of a horizontal size and a vertical size of the given image data.

Accordingly, error due to fraction rounding in the reduction process or in the expansion process is eliminated, and thus matching of an image size after the reduction and the expansion to an image size of an original image is possible, accurately. Therefore, it is possible to improve image quality after processing such as after the synthesizing process.

(3) The image processor according to (1), further comprising a system controller which: judges whether or not an amount of blurring indicative of a degree of the blurring process is equal to or more than a predetermined value; causes the image processing section to reduce the given image data at the predetermined reduction rate by the image data reduction part, to perform the spatial filter process on the reduced image data by the spatial filter processing part, and to expand the processed image data processed with the spatial filter process at the expansion rate by the image data expansion part, when the amount of blurring is equal to or more than the predetermined value; and causes the image processing section to perform only the spatial filter process on the given image data by the spatial filter processing part, when the amount of blurring is less than the predetermined value.

Accordingly, since only the spatial filter process is performed in accordance with the amount of blurring, it is possible to perform the blurring process having the great effect, while realizing detailed blurring expression. Specifically, the blurring process is performed through the reduction, the spatial filter processing, and the expansion of the image data when the amount of blurring is large, while the blurring process is performed only through the spatial filter processing when the amount of blurring is large. Therefore, it is possible to reduce a burden on the filter processing, and to perform the effective blurring process.

(4) The image processor according to (1), further comprising a system controller which changes a characteristic of a spatial filter of the spatial filter process performed by the spatial filter processing part, in accordance with the reduction rate of the image data reduction part.

Accordingly, it is possible to compensate the change in the blurring characteristic accompanied by the reduction and the expansion. Therefore, it is possible to perform the high grade blurring process.

(5) An image processing method which performs a blurring process on a given image data, the method comprising: reducing the given image data at a predetermined reduction rate to generate a reduced image data; performing a spatial filter process on the reduced image data to generate a processed image data; and expanding the processed image data processed with the spatial filter process at an expansion rate inverse of the reduction rate.

Accordingly, since the blurring process is performed through the reduction, the spatial filter processing, and the expansion of the image data, a burden on the filter processing is reduced. Therefore, it is possible to provide an image processing method which realizes a great effect of blurring by simplified image processing. Specifically, it is possible to perform the blurring process having a great effect, without incurring a rise in costs and without decreasing processing speed.

(6) The image processing method according to (5), wherein a denominator of the reduction rate is set at a value of a common divisor of a horizontal size and a vertical size of the given image data.

Accordingly, an error due to fraction rounding in the reduction process or in the expansion process is eliminated, and thus matching of an image size after the reduction and the expansion to an image size of an original image is possible, accurately. Therefore, it is possible to improve image quality after processing such as after the synthesizing process.

(7) The image processing method according to (5), further comprising: judging whether or not an amount of blurring indicative of a degree of the blurring process is equal to or more than a predetermined value; and performing only the spatial filter process on the given image data when the amount of blurring is less than the predetermined value, wherein, when the amount of blurring is equal to or more than the predetermined value, the given image data is reduced at the predetermined reduction rate, the reduced image data is processed with the spatial filter process, and the processed image data processed with the spatial filter process is expanded at the expansion rate.

Accordingly, since only the spatial filter process is performed in accordance with the amount of blurring, it is possible to perform the blurring process having the great effect, while realizing detailed blurring expression. Specifically, the blurring process is performed through the reduction, the spatial filter processing, and the expansion of the image data when the amount of blurring is large, while the blurring process is performed only through the spatial filter processing when the amount of blurring is small. Therefore, it is possible to reduce a burden on the filter processing, and to perform the effective blurring process.

(8) The image processing method according to (5), further comprising changing a characteristic of a spatial filter of the spatial filter process in accordance with the reduction rate.

Accordingly, it is possible to compensate the change in the blurring characteristic accompanied by the reduction and the expansion. Therefore, it is possible to perform the high grade blurring process.

(9) A digital camera, comprising the image processor according to any one of (1) to (4).

(10) An imaging apparatus, comprising the image processor according to any one of (1) to (4).

Accordingly, since the blurring process is performed through the reduction, the spatial filter processing, and the expansion of the image data, a burden on the filter processing is reduced. Therefore, it is possible to provide a digital camera and an imaging apparatus which realize a great effect of blurring by simplified image processing. Specifically, it is possible to perform the blurring process on a limited resource of the digital camera or the imaging apparatus, and to realize the blurring process having the great effect with a reduced amount of processes.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based on the language employed in the claims and not limited to examples described in the present description or during the prosecution of the application, in which examples are to be construed as non-exclusive. For example, in the present disclosure, the term "preferably", "preferred" or the like is non-exclusive and means "preferably", but not limited to. The use of the terms first, second, etc. do not denote any order or importance, but rather the terms first, second, etc. are used to distinguish one element from another.

The present application is based on and claims priorities from Japanese Patent Application Serial Number 2007-196507, filed Jul. 27, 2007, and No. 2008-012251, filed Jan. 23, 2008, the disclosures of which are hereby incorporated by reference herein in their entirety.

The invention claimed is:

1. An image processor, comprising:
a separation and generation section for separating a main subject image region and a background image region from an original image data and generating a subject image data and a background image data,
an image processing section which performs a blurring process on the background image data,
an image synthesizing section for synthesizing the blurred background image data processed by the image processing section and the subject image data,
wherein the image processing section includes:
an image data reduction part which reduces the background image data at a predetermined reduction rate to generate a reduced background image data;
a spatial filter processing part which performs a spatial filter process on the reduced background image data to generate a processed background image data; and
an image data enlarging part which enlarges the processed background image data at an enlarging rate which is an inverse of the reduction rate.

2. The image processor according to claim 1, further comprising a system controller which sets a denominator of the reduction rate at a value of a common divisor of a horizontal size and a vertical size of the background image data.

3. The image processor according to claim 1, further comprising a system controller which is configured to:
judge whether or not an amount of blurring indicative of a degree of the blurring process is equal to or more than a predetermined value;
cause the image processing section to reduce the background image data at the predetermined reduction rate by the image data reduction part, to perform the spatial filter process on the reduced background image data by the spatial filter processing part, and to enlarge the processed background image data processed with the spatial filter process at the enlarging rate by the image data enlarging part, when the amount of blurring is equal to or more than the predetermined value; and
cause the image processing section to perform only the spatial filter process on the background image data by the spatial filter processing part, when the amount of blurring is less than the predetermined value.

4. The image processor according to claim 1, further comprising a system controller which changes a characteristic of a spatial filter of the spatial filter process performed by the spatial filter processing part, in accordance with the reduction rate of the image data reduction part.

5. An image processing method comprising the steps of:
separating a main subject image region and a background image region from an original image data and generating a subject image data and a background image data,
performing a blurring process on the background image data, and
synthesizing the blurred background image data and the subject image data,
wherein the method further comprises the steps of:
reducing the background image data at a predetermined reduction rate to generate a reduced background image data;
performing a spatial filter process on the reduced background image data to generate a processed background image data; and
enlarging the processed background image data at an enlarging rate which is an inverse of the reduction rate.

6. The image processing method according to claim 5, wherein a denominator of the reduction rate is set at a value of a common divisor of a horizontal size and a vertical size of the background image data.

7. The image processing method according to claim 5, further comprising the steps of:
judging whether or not an amount of blurring indicative of a degree of the blurring process is equal to or more than a predetermined value; and
performing only the spatial filter process on the background image data when the amount of blurring is less than the predetermined value,
wherein, when the amount of blurring is equal to or more than the predetermined value, the background image data is reduced at the predetermined reduction rate, the reduced background image data is processed with the spatial filter process, and the processed background image data processed with the spatial filter process is enlarged at the enlarging rate.

8. The image processing method according to claim 5, further comprising the step of:
changing a characteristic of a spatial filter of the spatial filter process in accordance with the reduction rate.

9. A digital camera, comprising the image processor according to any one of claims 1 to 4.

10. An imaging apparatus, comprising the image processor according to any one of claims 1 to 4.

* * * * *